(12) United States Patent
Beers et al.

(10) Patent No.: US 11,920,488 B2
(45) Date of Patent: Mar. 5, 2024

(54) TURBINE HOUSING WELD REPAIR

(71) Applicant: HAMILTON SUNDSTRAND CORPORATION, Charlotte, NC (US)

(72) Inventors: Craig M. Beers, Wethersfield, CT (US); Clarence J. Wytas, Stafford Springs, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 1166 days.

(21) Appl. No.: 16/450,084

(22) Filed: Jun. 24, 2019

(65) Prior Publication Data
US 2019/0309654 A1 Oct. 10, 2019

Related U.S. Application Data

(62) Division of application No. 15/094,020, filed on Apr. 8, 2016, now Pat. No. 10,400,628.

(51) Int. Cl.
| | |
|---|---|
| *F01D 25/16* | (2006.01) |
| *B23P 6/04* | (2006.01) |
| *B29C 65/56* | (2006.01) |
| *F16L 13/02* | (2006.01) |
| *F16L 13/14* | (2006.01) |
| *F16L 41/08* | (2006.01) |

(52) U.S. Cl.
CPC .............. *F01D 25/16* (2013.01); *B23P 6/04* (2013.01); *B29C 65/565* (2013.01); *F05D 2230/10* (2013.01); *F05D 2230/80* (2013.01); *F05D 2240/54* (2013.01); *F16L 13/0209* (2013.01); *F16L 13/147* (2013.01); *F16L 41/082* (2013.01); *Y10T 29/49737* (2015.01)

(58) Field of Classification Search
CPC ...... F01D 25/16; F01D 25/00; F05D 2240/54; F05D 2240/50
USPC ............................................. 415/215.1
See application file for complete search history.

(56) References Cited

U.S. PATENT DOCUMENTS

| | | | |
|---|---|---|---|
| 2,037,962 A * | 4/1936 | Brown | F16L 13/0209 |
| | | | 285/332 |
| 3,572,775 A | 3/1971 | Bloom | |
| 5,921,683 A | 7/1999 | Merritt et al. | |
| 7,367,122 B2 * | 5/2008 | Yip | F01D 11/02 |
| | | | 29/458 |

(Continued)

*Primary Examiner* — Kenneth J Hansen
*Assistant Examiner* — Kelsey L Stanek
(74) *Attorney, Agent, or Firm* — CANTOR COLBURN LLP

(57) ABSTRACT

A repaired turbine housing for use in an air cycle machine including a journal bearing bore having an inlet, an outlet, and an inner diameter of about 2.580±0.001 inches (6.553±0.003 centimeters). The repaired turbine housing including a cylindrical insert secured within the journal bearing bore. The cylindrical insert having a first end, a second end, an inner surface, a step located at the first end, and an outer surface with an outer diameter that provides a diametric interference with the inner diameter of the journal bearing bore. The diametric interference being between about 0.000-0.003 inches (0.000-0.008 centimeters). The cylindrical insert being inserted into the inlet of the journal bearing bore up to the step. The step has an outer diameter greater than the outer diameter of the cylindrical insert. The inner surface of the cylindrical insert includes at least one selected inner diameter.

11 Claims, 7 Drawing Sheets

(56) References Cited

U.S. PATENT DOCUMENTS

| | | | |
|---|---|---|---|
| 7,934,303 B2 | 5/2011 | Awwad et al. | |
| 8,475,114 B2 | 7/2013 | Rosen et al. | |
| 2005/0210875 A1* | 9/2005 | Larue | F16C 37/002 60/602 |
| 2011/0008164 A1* | 1/2011 | Presz, Jr. | F03D 1/04 415/211.2 |
| 2015/0323000 A1* | 11/2015 | Shoup | F16C 17/028 384/114 |
| 2016/0298491 A1* | 10/2016 | Hettinger | F02C 6/12 |
| 2017/0292404 A1 | 10/2017 | Beers et al. | |

* cited by examiner

TURBINE HOUSING WELD REPAIR

CROSS-REFERENCE TO RELATED APPLICATIONS

This application claims the benefit of U.S. Non Provisional application Ser. No. 15/094,020 filed Apr. 8, 2016, which is incorporated herein by reference in its entirety.

BACKGROUND

The subject matter disclosed herein generally relates to air cycle machines and, more particularly, to a method for repairing turbine housings of air cycle machines.

Conventional aircraft environmental control systems incorporate an air cycle machine, also referred to as an air cycle cooling machine, for use in cooling and dehumidifying air for an aircraft cabin. Such air cycle machines may include two or more wheels disposed at axially spaced intervals along a common shaft. The wheels are part of, for example, a compressor rotor, a turbine rotor, a fan rotor, an additional turbine rotor, or an additional compressor rotor. In some cases the turbine(s) drives both the compressor and the fan.

On aircraft powered by turbine engines, the air to be conditioned in the air cycle machine is typically compressed air bled from one or more compressor stages of the turbine engine. In conventional systems, this bleed air passes through the air cycle machine compressor where it is further compressed. The compressed air is then passed through a heat exchanger to cool the compressed air sufficiently to remove moisture and dehumidify the air. The dehumidified compressed air is expanded in the turbine of the air cycle machine to both extract energy from the compressed air so as to drive the shaft and also to cool the expanded turbine exhaust air before it is supplied to the aircraft cabin as conditioned cooling air.

SUMMARY

According to one embodiment, a method for repairing a turbine housing of an air cycle machine is provided. The method comprises: removing damaged material from a journal bearing bore of the turbine housing; and forming the journal bearing bore to an inner diameter of about 2.580±0.001 inches (6.553±0.003 centimeters). The journal bearing bore having an inlet and an outlet. The method also comprises determining the inner diameter of the journal bearing bore; and forming a cylindrical insert having a first end, a second end, an inner surface, a step located at the first end, and an outer surface with an outer diameter that provides a diametric interference with the inner diameter of the journal bearing bore. The diametric interference being between about 0.000-0.003 inches (0.000-0.008 centimeters). The method further comprises inserting the second end of the cylindrical insert into the inlet of the journal bearing bore up to the step. The step having an outer diameter greater than the outer diameter of the cylindrical insert. The method yet further comprises securing the cylindrical insert to the turbine housing; and forming the inner surface of the cylindrical insert to at least one selected inner diameter.

In addition to one or more of the features described above, or as an alternative, further embodiments of the method may include securing the cylindrical insert to the turbine housing by forming a fillet weld between the step and the turbine housing.

In addition to one or more of the features described above, or as an alternative, further embodiments of the method may include that the outer diameter of the step is at most about 0.060 inches (0.152 centimeters) greater than the outer diameter of the cylindrical insert.

In addition to one or more of the features described above, or as an alternative, further embodiments of the method may include that the at least one selected inner diameter includes a first selected inner diameter of about 2.261±0.001 inches (5.743±0.003 centimeters).

In addition to one or more of the features described above, or as an alternative, further embodiments of the method may include that the first selected inner diameter includes a permissible step with a size of at most about 0.010 inches (0.025 centimeters) located at a distance of about 1.655 inches (4.204 centimeters) away from the outlet to a distance of about 2.935 inches (7.455 centimeters) away from the outlet.

In addition to one or more of the features described above, or as an alternative, further embodiments of the method may include that the inner surface of the cylindrical insert includes a first seal groove having a width of about 0.134±0.005 inches (0.340±0.013 centimeters) and a second seal groove having a width of about 0.134±0.005 inches (0.340±0.013 centimeters).

In addition to one or more of the features described above, or as an alternative, further embodiments of the method may include that the at least one selected inner diameter includes a first seal groove diameter at the first seal groove of about 2.424±0.002 inches (6.157±0.005 centimeters) and a second seal groove diameter at the second seal groove of about 2.424±0.002 inches (6.157±0.005 centimeters).

In addition to one or more of the features described above, or as an alternative, further embodiments of the method may include that the cylindrical insert has a wall thickness of at least about 0.030 inches (0.076 centimeters) at the first seal groove; and the cylindrical insert has a wall thickness of at least about 0.030 inches (0.076 centimeters) at the second seal groove.

In addition to one or more of the features described above, or as an alternative, further embodiments of the method may include that the journal bearing bore has a length of about 3.655±0.005 inches (9.284±0.013 centimeters).

In addition to one or more of the features described above, or as an alternative, further embodiments of the method may include that the cylindrical insert is composed of 6061-T6 aluminium.

According to another embodiment a repaired turbine housing for use in an air cycle machine is provided. The repaired turbine housing comprises a journal bearing bore having an inlet, an outlet, and an inner diameter of about 2.580±0.001 inches (6.553±0.003 centimeters); and a cylindrical insert secured within the journal bearing bore and having a first end, a second end, an inner surface, a step located at the first end, and an outer surface with an outer diameter that provides a diametric interference with the inner diameter of the journal bearing bore. The diametric interference being between about 0.000-0.003 inches (0.000-0.008 centimeters). The cylindrical insert being inserted into the inlet of the journal bearing bore up to the step. The step has an outer diameter greater than the outer diameter of the cylindrical insert. The inner surface of the cylindrical insert includes at least one selected inner diameter. The repaired turbine housing has been undergone a stress relief by heating the repaired turbine housing with the cylindrical insert secured within the journal bearing bore.

In addition to one or more of the features described above, or as an alternative, further embodiments may include that the cylindrical insert is secured within the journal bearing bore via a fillet weld at the step.

In addition to one or more of the features described above, or as an alternative, further embodiments may include that the outer diameter of the step is at most about 0.060 inches (0.152 centimeters) greater than the outer diameter of the cylindrical insert.

In addition to one or more of the features described above, or as an alternative, further embodiments may include that the at least one selected inner diameter includes a first selected inner diameter of about 2.261±0.001 inches (5.743±0.003 centimeters).

In addition to one or more of the features described above, or as an alternative, further embodiments may include that the first selected inner diameter includes a permissible step with a size of at most about 0.010 inches (0.025 centimeters) located at a distance of about 1.655 inches (4.204 centimeters) away from the outlet to a distance of about 2.935 inches (7.455 centimeters) away from the outlet.

In addition to one or more of the features described above, or as an alternative, further embodiments may include that the inner surface of the cylindrical insert includes a first seal groove having a width of about 0.134±0.005 inches (0.340±0.013 centimeters) and a second seal groove having a width of about 0.134±0.005 inches (0.340±0.013 centimeters).

In addition to one or more of the features described above, or as an alternative, further embodiments may include that the at least one selected inner diameter includes a first seal groove diameter at the first seal groove of about 2.424±0.002 inches (6.157±0.005 centimeters) and a second seal groove diameter at the second seal groove of about 2.424±0.002 inches (6.157±0.005 centimeters).

In addition to one or more of the features described above, or as an alternative, further embodiments may include that the cylindrical insert has a wall thickness of at least about 0.030 inches (0.076 centimeters) at the first seal groove; and the cylindrical insert has a wall thickness of at least about 0.030 inches (0.076 centimeters) at the second seal groove.

In addition to one or more of the features described above, or as an alternative, further embodiments may include that the journal bearing bore has a length of about 3.655±0.005 inches (9.284±0.013 centimeters).

In addition to one or more of the features described above, or as an alternative, further embodiments may include that the cylindrical insert is composed of 6061-T6 aluminium.

Technical effects of embodiments of the present disclosure include a method for repairing a damaged turbine housing of an air cycle machine by removing the damaged portion, inserting a cylindrical insert, and reforming the internal diameter of the cylindrical insert to match the original dimensional requirements.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The subject matter is particularly pointed out and distinctly claimed at the conclusion of the specification. The foregoing and other features, and advantages of the present disclosure are apparent from the following detailed description taken in conjunction with the accompanying drawings in which:

The detailed description explains embodiments of the present disclosure, together with advantages and features, by way of example with reference to the drawings.

DETAILED DESCRIPTION

Figure 1:
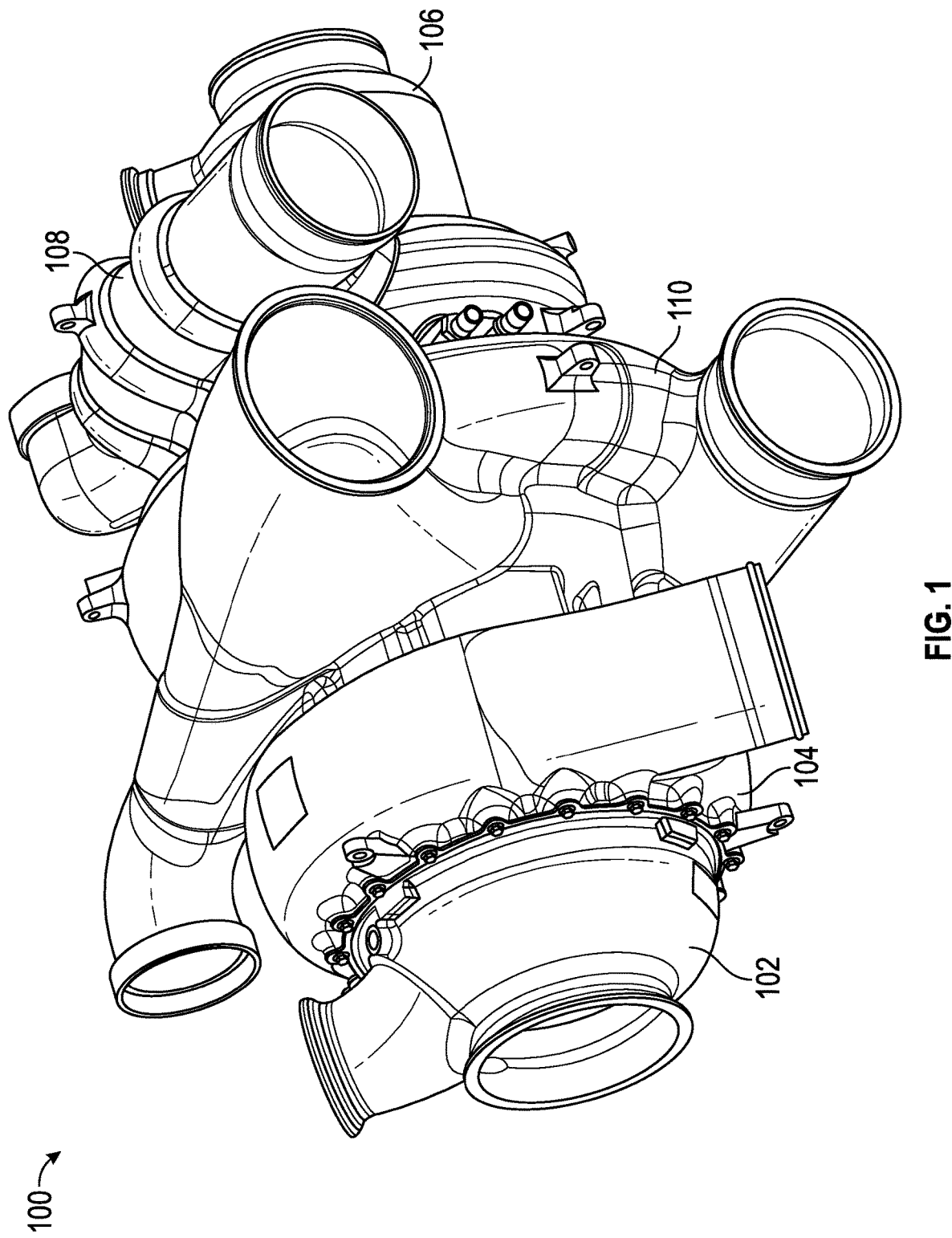
FIG. 1 is an isometric schematic view of an air cycle machine that may incorporate embodiments of the present disclosure.
Figure 2:
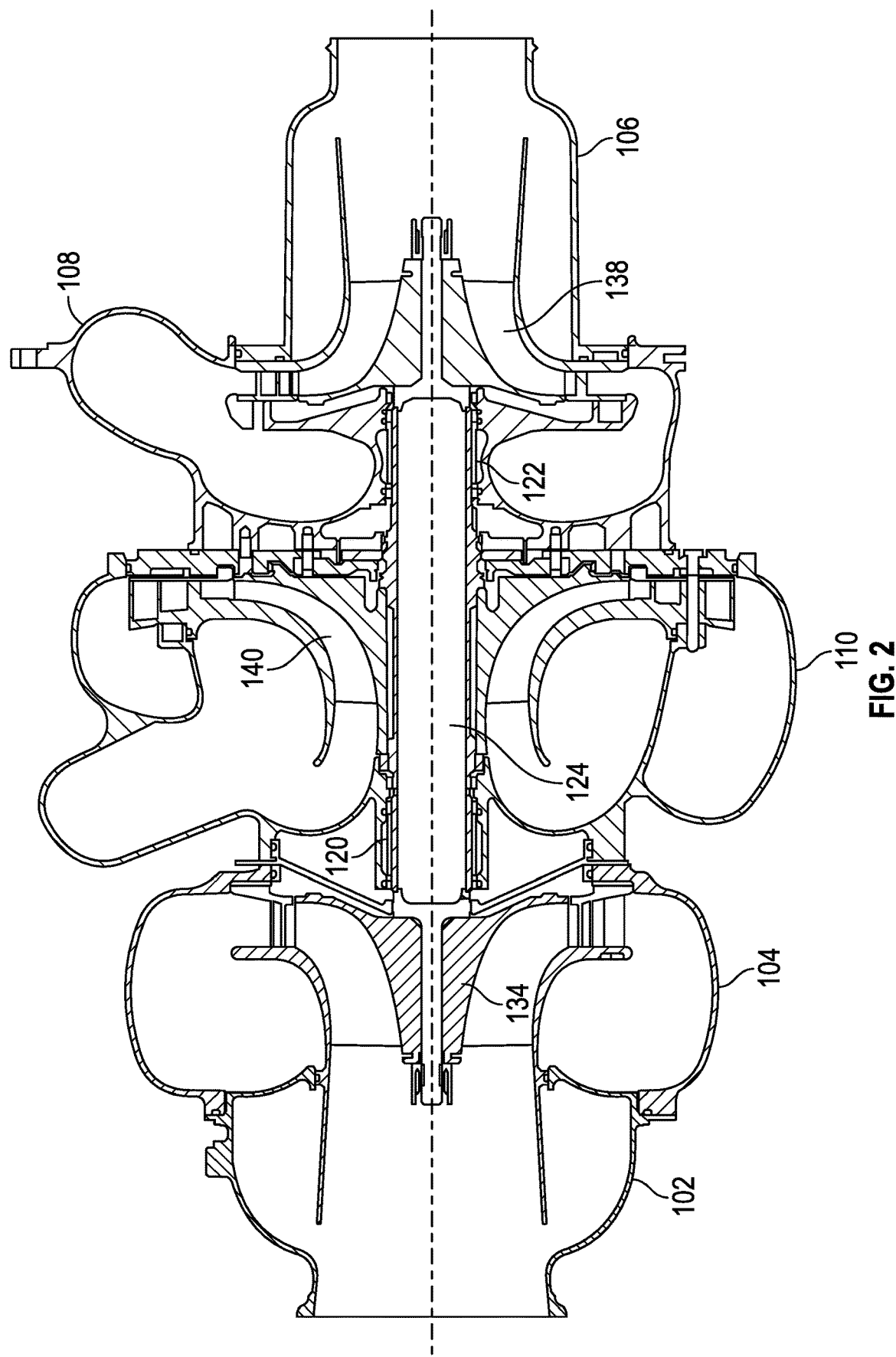
FIG. 2 is a cross-sectional schematic view of the air cycle machine of FIG. 1.

Referring now to FIGS. 1 & 2, FIG. 1 shows an isometric schematic view of an air cycle machine 100 that may incorporate embodiments of the present disclosure and FIG. 2 shows a cross-sectional schematic view of the air cycle machine 100 of FIG. 1. As shown in FIG. 1, the air cycle machine 100 includes a first bypass housing 102 and a first turbine housing 104. On an opposing end of the air cycle machine 100 is a second bypass housing 106 and a second turbine housing 108. Located between the first turbine housing 104 and the second turbine housing 108 is a compressor housing 110. As shown, the first bypass housing 102, the first turbine housing 104, the compressor housing 110, the second turbine housing 108, and the second bypass housing 106 are arranged axially to form the air cycle machine 100. As shown in FIG. 2, an air bearing shaft 124 connects a first turbine 134 within the first turbine housing 104, the compressor rotor 140 within the compressor housing 110, and the second turbine 138 within the second turbine housing 108. The air bearing shaft 124 rotates within a first journal bearing 120 and a second journal bearing 122. Those of skill in the art will appreciate that the turbine housing may be configured for any turbine of an air cycle machine.

Figure 3:
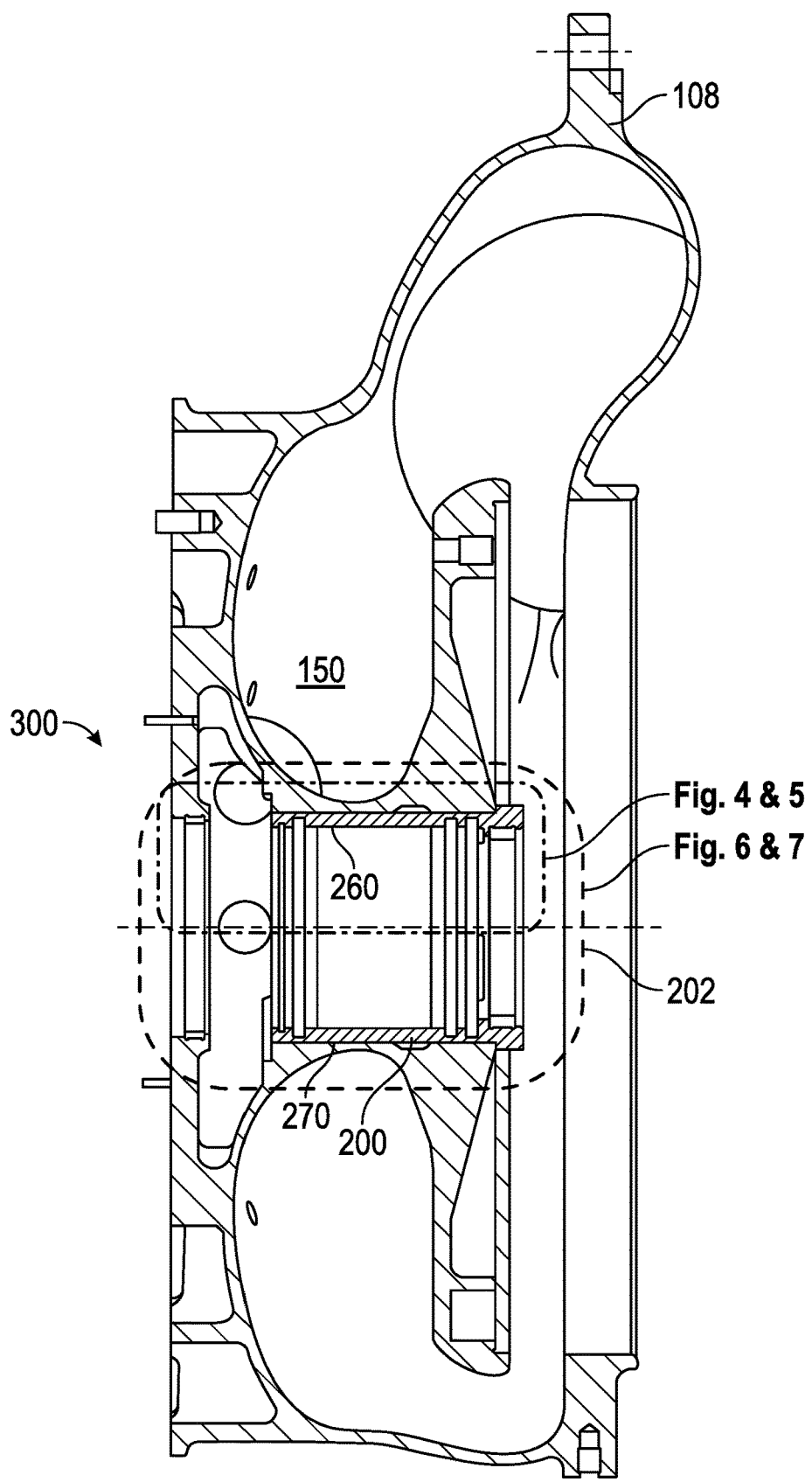
FIG. 3 is a cross-sectional schematic view of a repaired turbine housing, according to embodiments of the present disclosure.
Figure 4:
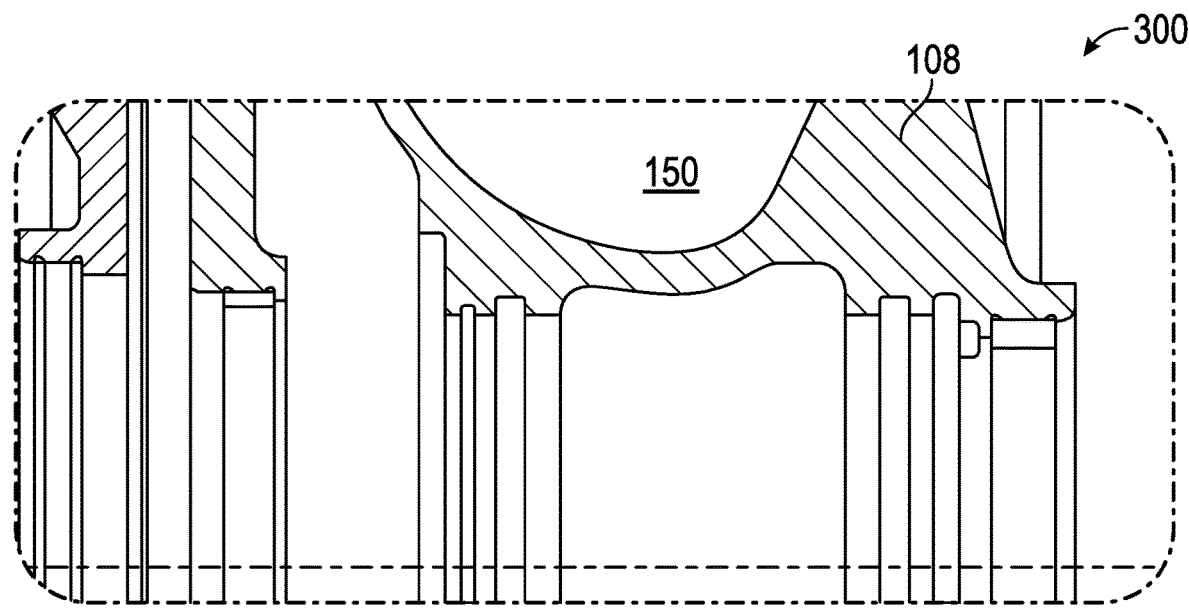
FIG. 4 is an enlarged cross-sectional schematic view of the turbine housing prior to the repair of FIG. 3, according to embodiments of the present disclosure.
Figure 5:
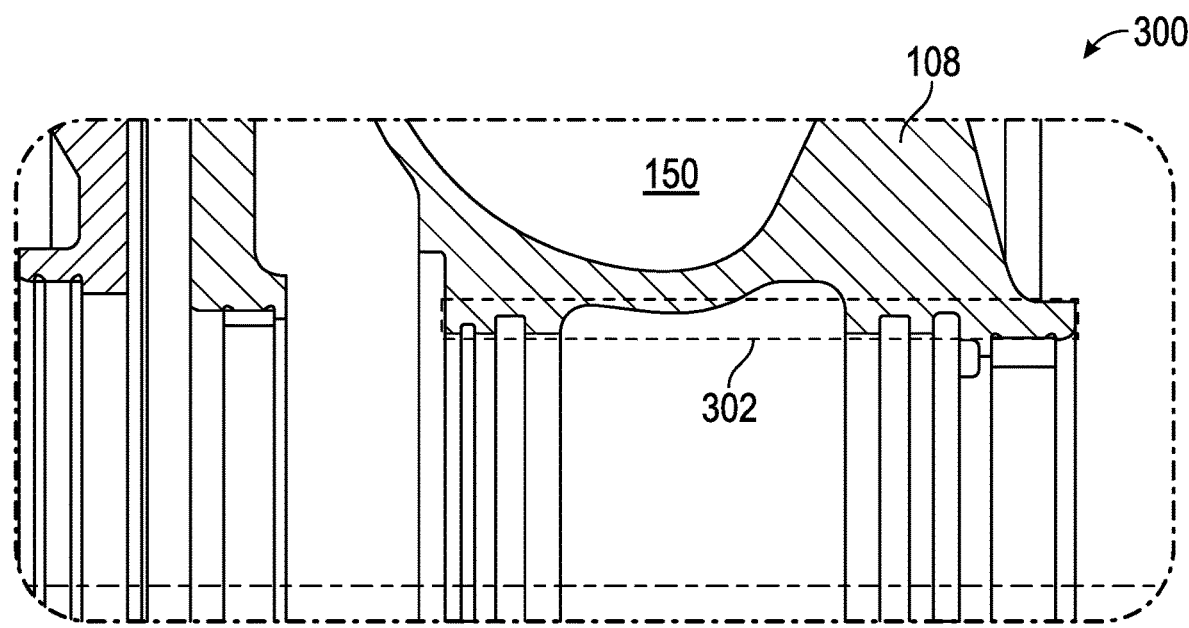
FIG. 5 is an enlarged cross-sectional schematic view of the turbine housing prior to the repair of FIG. 3, according to embodiments of the present disclosure.
Figure 6:
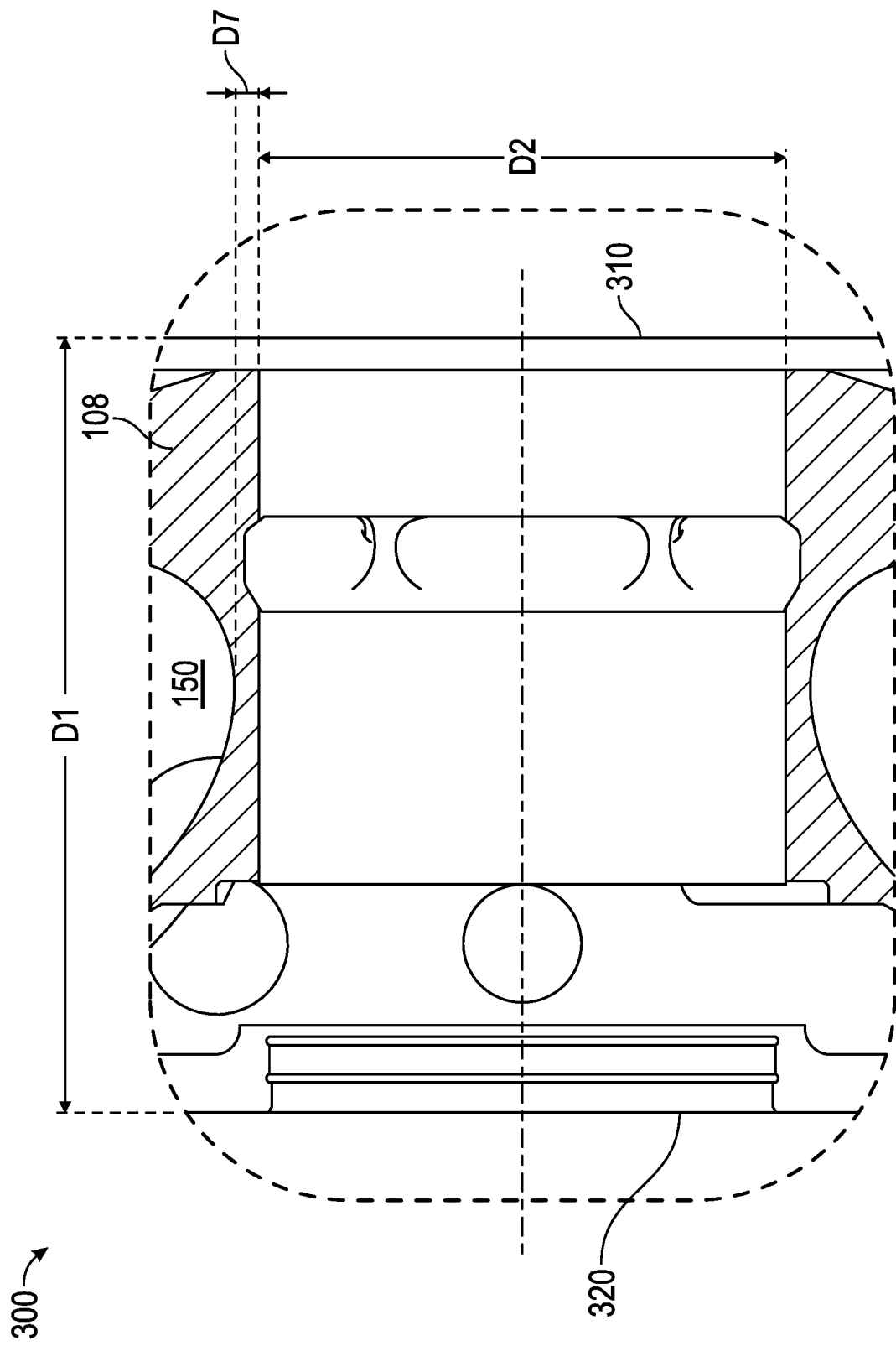
FIG. 6 is an enlarged cross-sectional schematic view a journal bearing bore of the repaired turbine housing of FIG. 3, according to embodiments of the present disclosure.
Figure 7:
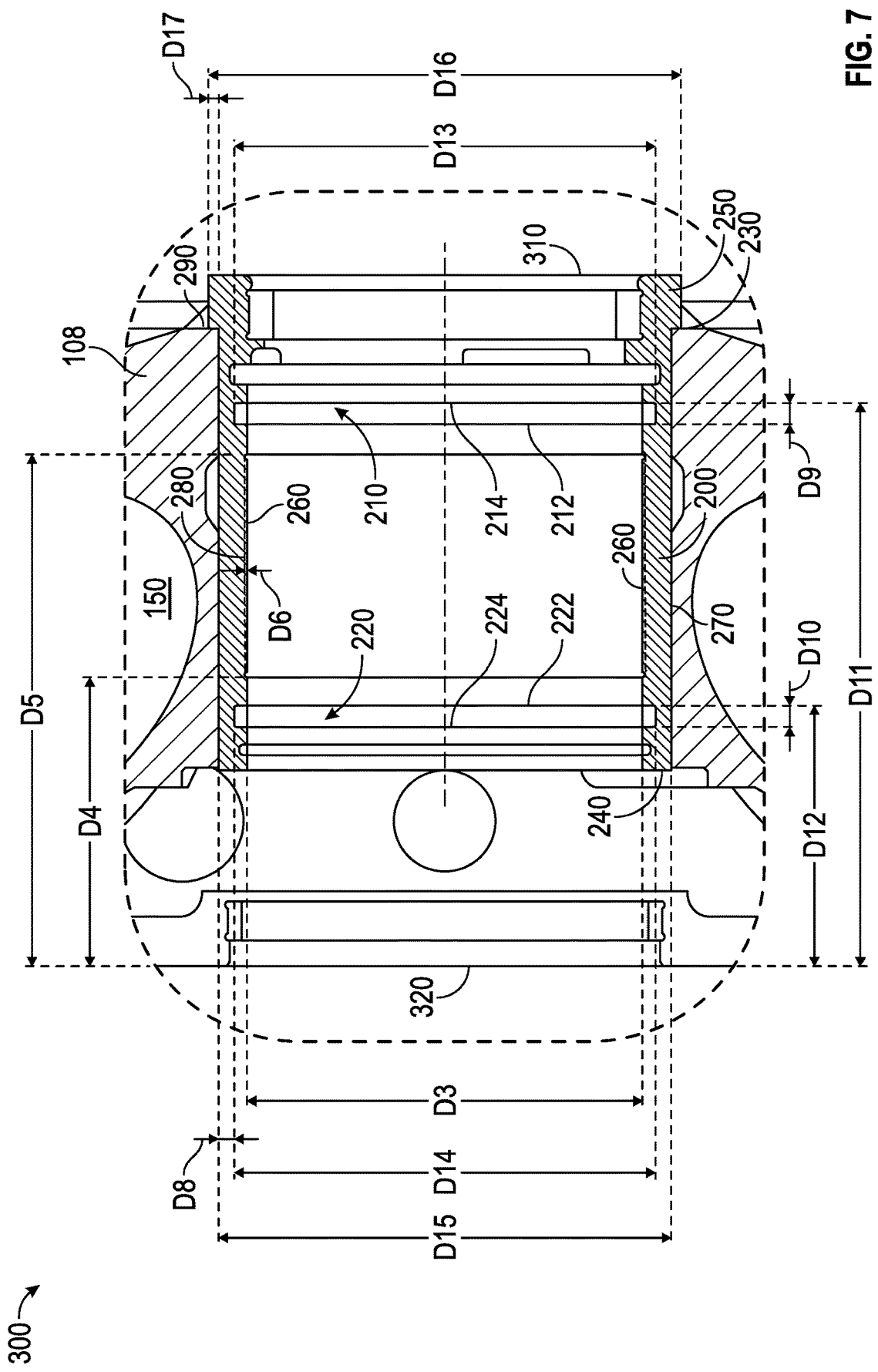
FIG. 7 is a cross-sectional schematic view of a cylindrical insert within the repaired turbine housing of FIG. 3, according to embodiments of the present disclosure.
Figure 8:
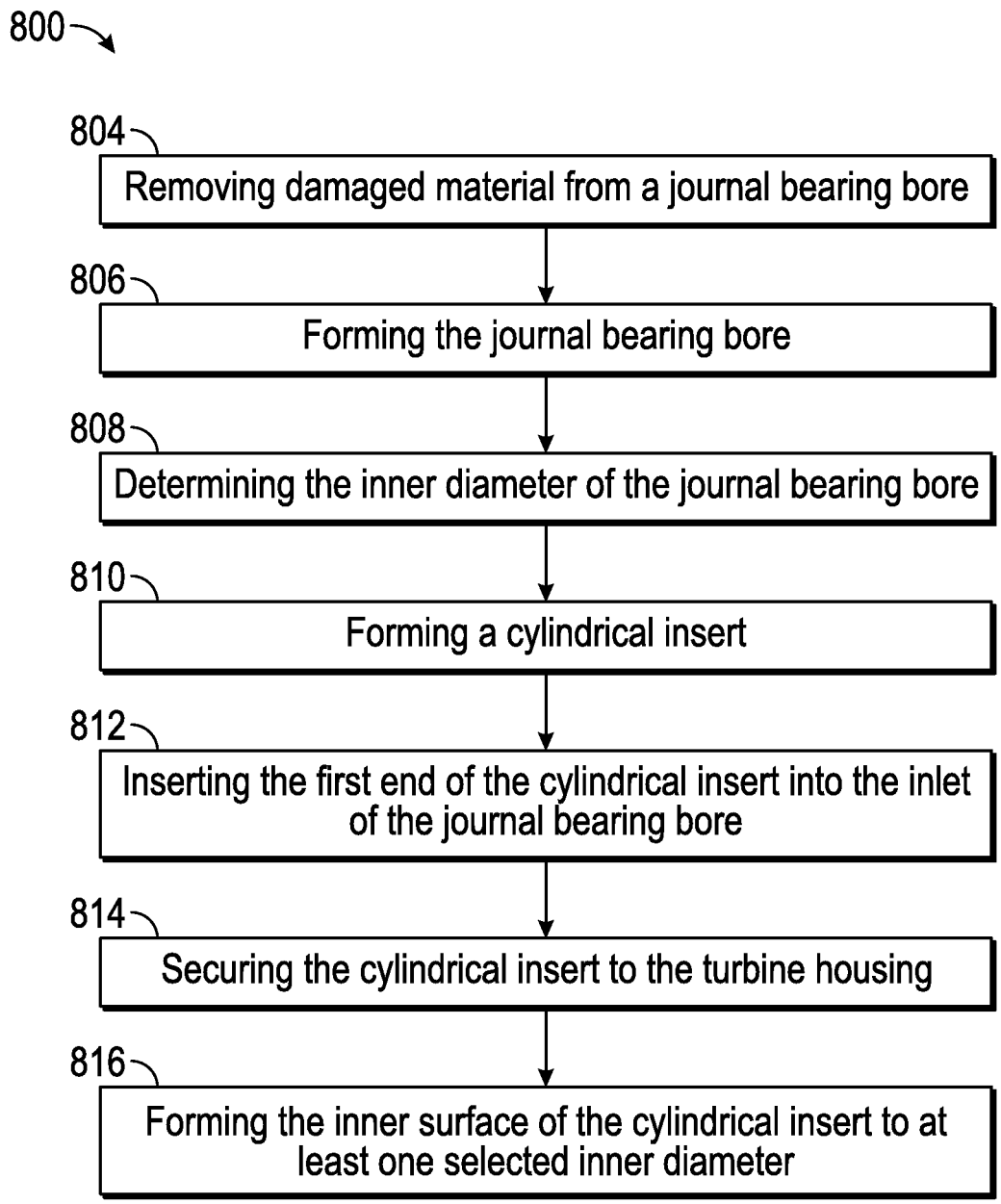
FIG. 8 is a process flow for repairing a damaged turbine housing, according to embodiments of the present disclosure.

Referring now also to FIG. 3-8. FIG. 3 shows a cross-sectional schematic view of a repaired second turbine housing 108 (hereinafter referred to as turbine housing 108), according to embodiments of the present disclosure. FIG. 4 shows an enlarged cross-sectional schematic view of the turbine housing 108 prior to the repair of FIG. 3, according to embodiments of the present disclosure. FIG. 5 shows an enlarged cross-sectional schematic view of the turbine housing 108 prior to the repair of FIG. 3, according to embodiments of the present disclosure. FIG. 6 shows an enlarged cross-sectional schematic view a journal bearing bore 300 of the repaired turbine housing 108 of FIG. 3, according to embodiments of the present disclosure. FIG. 7 is a cross-sectional schematic view of a cylindrical insert 200 within the repaired turbine housing 108 of FIG. 3, according to embodiments of the present disclosure. FIG. 8 is a flow process for repairing a damaged turbine housing, according to embodiments of the present disclosure.

In the event the journal bearing bore 300 becomes damaged the repair method 800 outlined in FIG. 8 may be followed to produce a repaired turbine housing 108 as seen in FIG. 3. The repaired section 202 includes a journal bearing bore 300 and a cylindrical insert 200 as can be seen in FIG. 3. The journal bearing bore 300 prior to any repair or damage may be seen in FIG. 4. Damage to the journal bearing bore 300 is typically seen in area 302 as illustrated in FIG. 5. The damage in area 302 must be removed prior to inserting the cylindrical insert 200. The repair method 800 initiates at block 804 by removing damaged material from the journal bearing bore 300 of the turbine housing 108. The damaged material in area 302 may be removed by a variety of methods including but not limited to honing, etching, drilling, machining, high-pressure water removal and laser removal. Next at block 806, the repair method 800 includes forming the journal bearing bore 300 to an inner diameter D2 of about 2.580±0.001 inches (6.553±0.003 centimeters). In the illustrated embodiment, the journal bearing bore 300 has an inlet 310 and an outlet 320, as seen in FIG. 6. In an embodiment, the turbine housing 108 may have a minimum wall thickness D7 of at least 0.040 inches (0.102 centimeters) between the journal bearing bore 300 and the turbine inlet cavity 150. The journal bearing bore 300 may have a length D1 of about 3.655±0.005 inches (9.284±0.013 centimeters), as seen in FIG. 6. Next at block 808, the repair method 800 includes determining the inner diameter of the journal bearing bore 300. The inner diameter of the journal bearing bore 300 may be measured in order to determine the outer diameter D15 of the cylindrical insert 200, which is utilized in the next step of the repair method 800 at block 810.

Next at block 810 of FIG. 8, the repair method 800 includes forming a cylindrical insert 200 having a first end 230, a second end 240, an inner surface 260, a step 250 located at the first end 230, and an outer surface 270 with an outer diameter D15 that provides a diametric interference with the inner diameter of the journal bearing bore. The diametric interference being between about 0.000-0.003 inches (0.000-0.008 centimeters). In another embodiment, the cylindrical insert 200 may be composed of 6061-T6 aluminium. In yet another embodiment, the cylindrical insert 200 may have a rockwell hardness of at least about 42 hrb. In the illustrated embodiment, the cylindrical insert 200, may include a step 250 located at the first end 230 of the cylindrical insert 200. The step 250 may have an outer diameter D16 greater than the outer diameter D15 of the cylindrical insert 200. In an embodiment, the outer diameter D16 of the step 250 is at most about 0.060 inches (0.152 centimeters) greater than the outer diameter D15 of the cylindrical insert 200, as seen by D17 in FIG. 7. In another embodiment, the cylindrical insert 200 may need to undergo a heat treatment as a final step of block 810 prior to moving onto the next step in the repair method 800 at block 812.

Then at block 812, the repair method 800 includes inserting the second end 240 of the cylindrical insert 200 into the inlet 310 of the journal bearing bore 300. In the illustrated embodiment, the cylindrical insert 200 may be inserted into the journal bearing bore 300 up to the first step 250, as seen in FIG. 7.

Moving onto block 814, the repair method 800 includes securing the cylindrical insert 200 to the turbine housing 108. In an embodiment, the cylindrical insert 200 may be secured to the turbine housing 108 via a fillet weld 290 between the step 250 and the turbine housing 108. In another embodiment, the fillet weld 290 may utilize fillet weld wire per AMS 4190 or AMS 4181 as a filler. In yet another embodiment, following the application of the fillet weld 290 to secure the cylindrical insert 200 to the turbine housing 108 at block 814, the entire turbine housing 108 may need to undergo a stress relief for about two hours at about 310° F.±10° F. In still yet another embodiment, the fillet weld 290 may need to undergo a penetrant inspection.

Lastly at block 816, the repair method 800 includes forming the inner surface 260 of the cylindrical insert 200 to at least one selected inner diameter. The at least one selected inner diameter may include a plurality of original dimensions. The original dimensions may be seen in FIG. 4, which illustrates the journal bearing bore 300 prior to the repair method 800. The original dimensions may also be seen in FIG. 7, which illustrates the journal bearing bore 300 after the repair method 800. The inner surface 260 may be formed back to the original dimensions by a variety of methods including but not limited to honing, etching, drilling, machining, high-pressure water removal and laser removal. In an embodiment, the at least one selected inner diameter includes a first selected inner diameter D3 of about 2.261±0.001 inches (5.743±0.003 centimeters). In another embodiment, the first selected inner diameter D3 includes a permissible step 280 with a size D6 of at most about 0.010 inches (0.025 centimeters) located at a distance D4 of about 1.655 inches (4.204 centimeters) away from the outlet 320 to a distance D5 of about 2.935 inches (7.455 centimeters) away from the outlet 320.

In the illustrated embodiment, the inner surface 260 of the cylindrical insert 200 includes a first seal groove 210 having a width D9 of about 0.134±0.005 inches (0.340±0.013 centimeters) and a second seal groove 220 having a width D10 of about 0.134±0.005 inches (0.340±0.013 centimeters). The at least one selected inner diameter includes a first seal groove diameter D13 at the first seal groove 210 of about 2.424±0.002 inches (6.157±0.005 centimeters) and a second seal groove diameter D14 at the second seal groove 220 of about 2.424±0.002 inches (6.157±0.005 centimeters). The first seal groove 210 includes an inward edge 212 and an outward edge 214. The outward edge 214 of the first seal groove 210 is located at a distance D11 of about 3.23±0.005 inches (8.204±0.013 centimeters) away from the outlet 320. The second seal groove 220 includes an inward edge 222 and an outward edge 224. The inward edge 222 of the second seal groove 220 is located at a distance D12 of about 1.5±0.005 inches (3.810±0.013 centimeters) away from the outlet 320. In another embodiment, the cylindrical insert 200 may have wall thickness D8 of at least about 0.030 inches (0.076 centimeters) at the first seal groove 210 and the second seal groove 220, as seen in FIG. 7. In yet another embodiment, once the inner surface 260 has been formed back to the original dimensions in block 816 a proof pressure test may be conducted on the repaired section 202. In still yet another embodiment, the repaired section 202 may need to undergo a penetrant inspection once the proof pressure test has been conducted.

While the above description has described the process flow of FIG. 8 in a particular order, it should be appreciated that unless otherwise specifically required the attached claims that the ordering of the steps may be varied.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:

1. An air cycle machine, comprising:
a compressor housing a compressor rotor;
a turbine housing having a turbine rotor, a journal bearing bore and a journal bearing disposed in the journal bearing bore;
an air bearing shaft, wherein the air bearing shaft rotates in the journal bearing, wherein the turbine rotor and the compressor rotor are axially connected via the air bearing shaft, and
wherein the turbine housing is a repaired turbine housing, wherein:
the journal bearing bore has an inlet, an outlet, and an inner diameter of 2.580±0.001 inches (6.553±0.003 centimeters), and
a cylindrical insert is secured within the journal bearing bore and having a first end, a second end, an inner surface, a step located at the first end, and an outer surface with an outer diameter that provides a diametric interference with the inner diameter of the journal bearing bore, the diametric interference being between 0.000-0.003 inches (0.000-0.008 centimeters), the cylindrical insert being inserted into the inlet of the journal bearing bore up to the step so that the step is outside of the journal bearing bore, wherein:
the step has an outer diameter that is greater than the outer diameter of the cylindrical insert;
the inner surface of the cylindrical insert includes at least one selected inner diameter;
the repaired turbine housing has undergone a stress relief by heating the repaired turbine housing with the cylindrical insert secured within the journal bearing bore;
the inner surface of the cylindrical insert includes a first seal groove and a second seal groove, the first seal groove has a first seal groove diameter of 2.424±0.002 inches (6.157±0.005 centimeters) and the second seal groove has a second seal groove diameter of 2.424±0.002 inches (6.157±0.005 centimeters);
the first seal groove includes an inward edge and an outward edge, wherein the outward edge of the first seal groove is located at a distance of 3.23±0.005 inches (8.204±0.013 centimeters) away from the outlet; and
the second seal groove includes an inward edge and an outward edge, wherein the inward edge of the second seal groove is located at a distance of 1.5±0.005 inches (3.810±0.013 centimeters) away from the outlet.

2. The air cycle machine of claim 1, wherein:
the cylindrical insert is secured within the journal bearing bore via a fillet weld at the step.

3. The air cycle machine of claim 1, wherein:
the outer diameter of the step is at most 0.060 inches (0.152 centimeters) greater than the outer diameter of the cylindrical insert.

4. The air cycle machine of claim 1, wherein:
the at least one selected inner diameter includes a first selected inner diameter of 2.261±0.001 inches (5.743±0.003 centimeters).

5. The air cycle machine of claim 4, wherein:
the first selected inner diameter includes a permissible step with a size of at most 0.010 inches (0.025 centimeters) located at a distance of 1.655 inches (4.204 centimeters) away from the outlet to a distance of 2.935 inches (7.455 centimeters) away.

6. The air cycle machine of claim 1, wherein:
the first seal groove has a width of 0.134±0.005 inches (0.340±0.013 centimeters) and the second seal groove has a width of 0.134±0.005 inches (0.340±0.013 centimeters).

7. The air cycle machine of claim 6, wherein:
the cylindrical insert has a wall thickness of at least 0.030 inches (0.076 centimeters) at the first seal groove; and
the cylindrical insert has a wall thickness of at least 0.030 inches (0.076 centimeters) at the second seal groove.

8. The air cycle machine of claim 1, wherein:
the journal bearing bore has a length of 3.655±0.005 inches (9.284±0.13 centimeters).

9. The air cycle machine of claim 1, wherein:
the cylindrical insert is composed of 6061-T6 aluminium.

10. The air cycle machine of claim 1, comprising:
a bypass connected to the turbine housing.

11. The air cycle machine of claim 10, comprising:
another bypass; and
another turbine housing having another turbine rotor, another journal bearing bore and another journal bearing disposed in the another journal bearing bore, wherein:
the another bypass is connected to the another turbine housing;
the air bearing shaft also rotates in the another journal bearing, and wherein the another turbine rotor is axially connected to the compressor rotor via the air bearing shaft.

* * * * *